Figure 1:
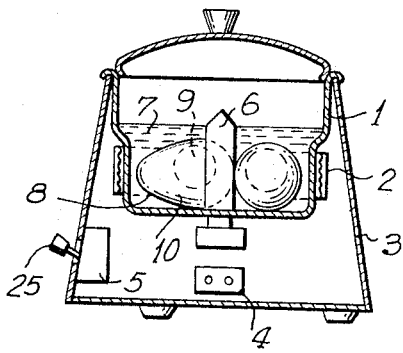

Oct. 18, 1966 MOTOKI SHINOHARA ET AL 3,280,304
APPARATUS FOR BOILING EGGS
Original Filed May 15, 1962 2 Sheets-Sheet 1

*INVENTORS*
MOTOKI SHINOHARA
YOZO MIKATA

BY

*McGlew & Toren*

ATTORNEYS

Oct. 18, 1966 MOTOKI SHINOHARA ET AL 3,280,304
APPARATUS FOR BOILING EGGS
Original Filed May 15, 1962

INVENTORS.
MOTOKI SHINOHARA
YOZO MIKATA

BY

*McGlew & Toren*
ATTORNEYS

United States Patent Office 3,280,304
Patented Oct. 18, 1966

3,280,304
APPARATUS FOR BOILING EGGS
Motoki Shinohara, Kamakura-shi, Kanagawa-ken, and Yozo Mikata, Kamo-shi, Niigata-ken, Japan, assignors to Tokyo Shibaura Denki Kabushiki Kaisha, Kawasaki-shi, Kanagawa-ken, Japan, a joint-stock company of Japan
Original application May 15, 1962, Ser. No. 194,772, now Patent No. 3,206,314, dated Sept. 14, 1965. Divided and this application Oct. 24, 1963, Ser. No. 324,160
4 Claims. (Cl. 219—441)

This application is a division of our copending application, Ser. No. 194,772, filed May 15, 1962, and now Patent No. 3,206,314.

This invention relates to methods and apparatuses for boiling eggs in their shells and more particularly to an improved method and apparatus for preparing so-called "hot-spring eggs," that is, special soft-boiled eggs of the type wherein the egg white is still in liquid and fluid state while the yolk is soft-boiled.

Eggs are very important food because they contain large amounts of nutritive elements and can be stored over a relatively long period. However, raw eggs as well as completely boiled eggs are relatively difficult to digest, so that soft boiled eggs are preferred from the viewpoint of digestion. While there are various methods of preparing soft-boiled eggs, considerable skill and time are required to prepare the so-called "hot-spring eggs."

This difficulty is mainly caused by the difference in coagulating or solidifying temperatures of the white and yolk of the egg. More particularly, usually the yolk begins to coagulate at a temperature in the range from 65° C. to 67° C., while the white begins to coagulate at from 75° C. to 80° C. Moreover, as the white has relatively low heat conductivity, in order to prepare soft-boiled eggs of the so-called hot-spring egg type, it has been customary to heat eggs for a long period of time at a low temperature of about 70° C., for example, a temperature which is insufficient to cause the white to coagulate. When cooking eggs at such a low temperature, about 30 minutes are required to prepare hot-spring eggs. If a higher temperature is utilized in order to reduce the cooking time, the white will nearly or completely coagulate even though the yolk is soft-boiled.

According to this invention soft-boiled eggs wherein the white is still in the liquid or semi-liquid state and, hence, is flowable, but the yolk is soft-boiled, are obtained by utilizing the relative characteristics of the white and yolk whereby the yolk begins to coagulate at a lower temperature than the white, the specific gravity of the yolk is lower than that of the white, and the heat conductivity of the yolk is higher than that of the white.

According to one embodiment of this invention, eggs are placed in water contained in a pot which is gently heated by an electric heater. A thermostat is provided to deenergize the electric heater when the temperature of the water reaches a predetermined value. Thereafter, the eggs are cooked to soft-boiled condition by utilizing the heat retained by the water. The temperature of the upper portion or layers of the water in the pot is maintained higher than the remaining portion of the water, whereby the yolk which is floating in the upper portion of liquid-state white is heated from above. By this novel method of applying heat, it has been found that the so-called hot-spring eggs can be prepared in a relatively short time.

The egg cooker constructed in accordance with the principle of this invention comprises a pot, an electric heater associated with the said pot, a manually-reset type electromagnetic switch for controlling the circuit of the said electric heater, a thermostat responsive to the temperature of water in the said pot to control the energizing circuit of said electromagnetic switch, and a temperature indicating pilot lamp controlled by the said thermostat to be lighted when said electric heater is deenergized and to be extinguished when the temperature of the pot water decreases below a predetermined value. An additional indicating lamp may be provided in parallel with the electric heater to be lighted when the electric heater is energized.

Figure 2:
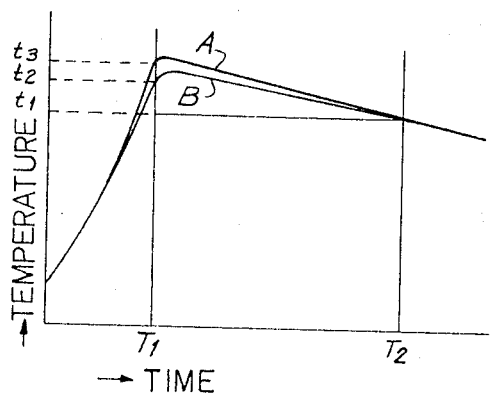
Figure 3:
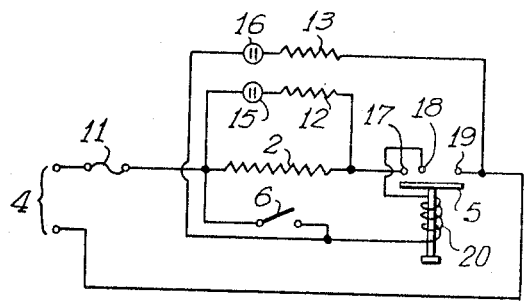
Figure 4:
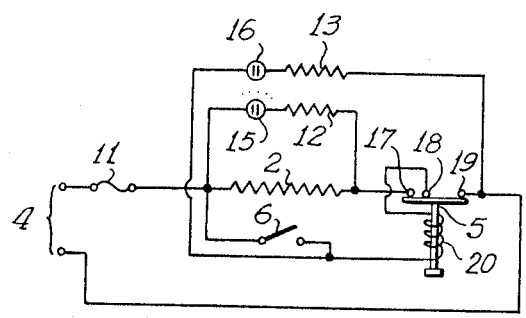
Figure 5:
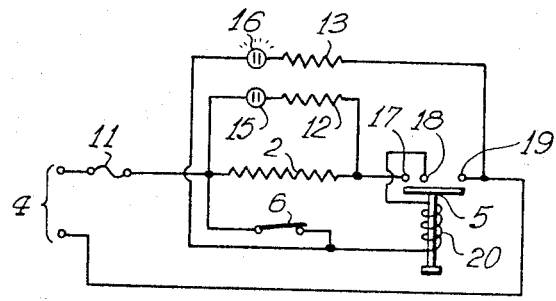
Figure 6:
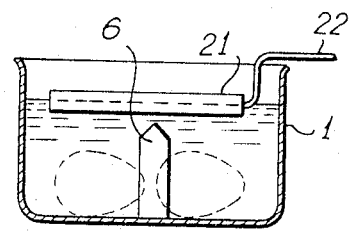
Figure 7:
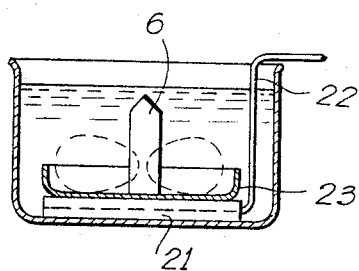

The features of the invention which are believed to be novel are set forth with particularity in the appended claims. The invention itself, however, as to its organization together with further objects and advantages thereof, may best be understood by reference to the following description taken in connection with the accompanying drawing, in which FIG. 1 shows a vertical section of an egg cooker embodying this invention;

FIG. 2 is a graphical representation indicating the relation between temperatures at upper and lower portions of the water in the pot and time;

FIGS. 3, 4 and 5 are circuit diagrams of the egg cooker embodying this invention, wherein FIG. 3 shows the condition before initiating cooking operation, FIG. 4 shows heating by an electric heater, and FIG. 5 shows the condition of heating by heat stored in the body of water in the pot; and FIGS. 6 and 7 are, respectively, schematic sectional views showing pots provided with other heating means in accordance with the present invention.

Referring now to the accompanying drawing, FIG. 1 illustrates schematically a cross section of an egg cooker suitable for cooking eggs according to the method of this invention. The egg cooker has a pot 1 of suitable metal such as aluminum, the lower portion thereof being of reduced diameter. Around the side wall of this reduced diameter portion is provided a suitable electric heater 2 to heat a body of water 7, contained in the pot 1, from its outer side. The pot is surrounded by a housing 3 on which a socket-and-plug connector 4 adapted to be connected with a source of electric supply and a manual reset type electromagnetic switch 5 are mounted. A suitable thermostat 6 is utilized to control the energization of said electromagnetic switch 5 in response to the temperature of the water 7.

Referring now to FIGS. 3, 4 and 5, the manual reset type electromagnetic switch 5 has three contacts 17, 18, and 19 and a coil 20 and is so designed that it will close contacts 17, 18, and 19 when manually actuated by a handle 25 and open these contacts upon energization of the coil 20. The coil 20 is connected to be controlled by said thermostat 6. An indicating or pilot lamp 15 is connected in parallel with the electric heater 2 via a current limiting resistor 12 so that the lamp 15 will be lighted when the electric heater 2 is energized. A second pilot lamp 16 for indicating the temperature of the egg cooker is connected across the connector 4 through the thermostat 6 and a current limiting resistor 13 so that it will be lighted when the heater 2 is deenergized and be extinguished when the temperature of the egg cooker decreases below a predetermined value. As is the practice well known in the art, a temperature-responsive fuse 11 is included in series with the electric heater 2.

The operation of the egg cooker of the above-described construction is as follows:

A suitable quantity of water 7 and one or several eggs 8 are placed in the pot 1. By the reason given hereinafter, it is advantageous to orientate the eggs horizontally as shown in FIG. 1. Then the handle 25 is manipulated to close the contacts 17, 18, and 19 of the electromagnetic switch 5 as shown in FIG. 4, thus initiating heating operation of the pot 1. At the same time, the pilot lamp 15 is lit to indicate that the electric heater 2 is being energized. Since the heater 2 is disposed to surround the lower side portion of the pot 1, the body of water 7 is heated by convection current of the water, and there is some difference in temperature between the upper portion or layers and lower portion or layers of the water. Thus the curve A of FIG. 2 represents the temperature of the water at the upper portion, while curve B represents that at the lower portion. When the temperature of the water at the upper portion reaches a predetermined value $t_3$, the thermostat 6 closes to momentarily energize the coil 20, causing the electromagnetic switch 5 to open and deenergize the electric heater as shown in FIG. 5. At this instant, the temperature of the water at the lower portion has a value of $t_2$ which is lower than $t_3$ by a predetermined value. The interval of time required for the water to reach these temperatures is indicated by $T_1$.

Subsequent to the time $T_1$ the heated water is gradually cooled, partly by giving some of its retained heat to the eggs 8 until a predetermined lower temperature $t_1$ is reached at the time $T_2$, at which time the thermostat 6 is restored to its original state as shown in FIG. 3 to deenergize the pilot lamp 16. Thus, the heat quantity available for coagulation of the yolk is the integral of the heat between $T_1$ and $T_2$.

As pointed out above, since the specific gravity of the yolk is less than that of the white, as schematically shown in FIG. 1, the yolk 9 floats in the upper portion of the white 10 in the egg shell when the egg is placed horizontally. Thus, the yolk is heated more from above, through the shell and a thin layer of the white 10, by the upper portion of the water which is at a higher temperature than the lower portion. Accordingly, the yolk coagulates first while the white is still in liquid state.

From the above description it will be noted that in accordance with this invention, so-called hot-spring eggs, that is soft-boiled eggs in which the yolk is soft-boiled and the white is not or very slightly coagulated can be prepared by placing eggs in the pot together with a suitable quantity of water and then by closing the electromagnetic switch 5. By the time $T_2$, soft-boiled eggs of the required state are cooked, and thereafter, the cooked eggs may be taken out of the pot at any desired time because the temperature $t_1$ is selected to be lower than the temperature at which neither the yolk nor the white coagulates, and the degree of coagulation of the soft-boiled yolk will not increase after the time $T_2$.

As an illustration, an example of this invention is given below.

500 cubic centimeters of water at 17° C. and three eggs were placed in a pot 1 heated by a 500-watt, band-type electric heater 2. The room temperature was 20° C. When the temperature $t_3$ of the upper portion of the water reached 81° C., the thermostat 6 operated to deenergize the electric heater 2. At this time the temperature $t_2$ of the lower portion of the water reached 78° C., and the time required for this state to be reached was 6 minutes. Thereafter, the eggs were cooked by the heat stored in the body of water until the time $T_2$ at which the temperature of the water, at both the upper and lower portions, decreased to 65° C., which corresponds to the temperature $t_1$ at which the yolk begins to coagulate. The interval between $T_1$ and $T_2$ was 14 minutes. The yolk and the white do not coagulate at any temperature below 65° C., so that the soft-boiled eggs can be removed at any time after $T_2$ without increasing the degree of coagulation of the yolk.

This invention is characterized by the fact the water in the egg cooker is heated to a predetermined temperature by energizing the electric heater for a relatively short interval to cook or soft-boil eggs by the heat stored in the body of water, and that a predetermined temperature difference is created between the upper and lower portions of the water to heat the yolk from above. Thus, the water in the pot should not be boiled or stirred to create an isothermal state throughout the body of water.

In order to create a temperature difference between the upper and lower portions of the water, any suitable method of heating other than that shown and described may be utilized. For example, and as shown in FIG 6, the electric heater 21 may be formed as a disc of a nature such as to float on the upper surface of the water. Heater 21 is provided with leads 22 which are led out over the upper periphery of pot 1. A thermostat 5 may be mounted in the pot 1, in the same manner as shown in FIG. 1, so as to be responsive to the temperature of the upper portion of the water in pot 1. In the arrangement shown in FIG. 6, the yolk of the egg can be heated more directly from above, and the water in the lower portion of pot 1 is heated by heat conduction along the side wall of the pot.

It is also possible, as shown in FIG 7, to submerge the disc-shaped heater 21 at the bottom of the pot and, in this case, a disc or shallow cup of heat insulating material, indicated at 23, and having an outer diameter somewhat smaller than the inside diameter of the pot 1, is placed directly on top of the heater 21 between the eggs and the heater in order to cause heated water to rise along the inner surface of the pot without directly contacting the eggs. Again, the leads 22 of the heater are brought out over the upper edge of pot 1. A thermostat 5 may be mounted in the cup 23, in the same manner as the thermostat 5 is mounted in the pot 1 in FIG. 1, so as to be responsive to the temperature of the upper portion of the water.

Thus, according to this invention, soft-boiled eggs of the so-called hot-spring type can be cooked in a relatively short period without any special skill. Moreover, the egg cooker of this invention not only can cook eggs in the desired manner, but also is convenient in use because it provides indications of heating by electricity, cooking by stored heat and completion of cooking.

In accordance with the provisions of the patent statutes we have explained the principle and operation of our invention and have illustrated and described what we consider to represent the best embodiment thereof. However, we desire to have it understood that within the scope of the appended claims, the invention may be practiced otherwise than as specifically illustrated and described.

What we claim as new and desire to secure by Letters Patent of the United States is:

1. An egg cooker comprising a pot having a substantially flat and horizontal bottom support surface and adapted to support eggs to be cooked therein in a substantially horizontal orientation and to contain water in an amount immersing said eggs therein, an elongated thermostat extending centrally and vertically upwardly in said pot to be responsive to the temperature of the upper portion of said body of water, an electric heater operatively associated with said pot to heat the water therein, and positioned above the bottom of the pot so as to create a predetermined temperature difference between the upper and lower portions of said body of water, an energizing circuit for energizing said heater, and an electric switch provided in said energizing circuit and operatively associated with said thermostat so as to be actuated by said thermostat to control said electric heater, said thermostat operating said switch to de-energize said electric heater responsive to a predetermined temperature of the upper portion of the water zone, at which predetermined temperature the white of said eggs begins to coagulate, said thermostat extending centrally and vertically upwardly from said shallow dish.

2. An egg cooker, as claimed in claim 1, in which said electric switch is a manually re-set electromagnetic switch actuated automatically by said thermostat.

3. An egg cooker according to claim 1, wherein said electric heater is of a disc form and is adapted to be disposed in said pot on the bottom wall thereof, and said support surface is comprised in a shallow dish of heat insulating material positioned on said electric heater and arranged to support the eggs in such substantially horizontal orientation, said thermostat extending centrally and vertically upwardly from said shallow dish.

4. An egg cooker comprising a pot adapted to contain a body of water and have a substantially flat and horizontal bottom support surface to support eggs to be cooked in a substantially horizontal orientation, and to contain water of an amount immersing said eggs therein, and a relatively elongated thermostat extending into the pot from the center of the bottom of the pot and with its longitudinal axis extending vertically, so as to be responsive to the temperature of the upper portion of said body of water, an electric heater floating on the surface of the water in said pot above the upper end of said thermostat, said heater being of disc form and arranged to heat said eggs from above, an energizing circuit for energizing said heater, an electric switch provided in said energizing circuit and operatively associated with said thermostat so as to be actuated by said thermostat to control said electric heater, said thermostat operating said switch to deenergize said electric heater responsive to a pre-determined temperature of the upper portion of the water zone, at which pre-determined temperature the yolk of said eggs begins to coagulate, said predetermined temperature being in the range from 75° to 80° C.

References Cited by the Examiner

UNITED STATES PATENTS

| | | | |
|---|---|---|---|
| 1,055,882 | 3/1913 | Cubitt | 99—331 |
| 1,506,676 | 8/1924 | Shahan | 219—441 X |
| 1,511,443 | 10/1924 | Bonoff | 219—281 X |
| 1,715,444 | 6/1929 | Bader | 219—441 |
| 1,817,090 | 8/1931 | McGowen | 219—43 |
| 2,472,178 | 6/1949 | Temple | 219—317 |
| 2,561,932 | 7/1951 | Landgraf | 219—317 X |
| 2,700,097 | 1/1955 | Morey | 219—43 |
| 2,700,723 | 7/1955 | Lynch | 219—435 X |

FOREIGN PATENTS

| | | |
|---|---|---|
| 146,880 | 6/1952 | Australia. |
| 1,045,285 | 6/1953 | France. |
| 315,097 | 6/1919 | Germany. |
| 396,400 | 5/1924 | Germany. |
| 601,041 | 4/1948 | Great Britain. |

ANTHONY BARTIS, *Primary Examiner.*